United States Patent [19]

Lake

[11] Patent Number: 5,079,794
[45] Date of Patent: Jan. 14, 1992

[54] VEHICLE WINDOW CLEANING ARRANGEMENT

[75] Inventor: Jan Lake, Kungälv, Sweden

[73] Assignee: AB Volvo, Gothenburg, Sweden

[21] Appl. No.: 364,320

[22] Filed: Jun. 12, 1989

[30] Foreign Application Priority Data

Jun. 29, 1988 [SE] Sweden ........................ 8802447

[51] Int. Cl.$^5$ .................. B60S 1/04; B60S 1/28
[52] U.S. Cl. .................................. 15/250.23
[58] Field of Search .......... 15/250.23, 250.13, 250.27, 15/250.33, 250.39, 250.41, 250.35

[56] References Cited

U.S. PATENT DOCUMENTS

| | | | |
|---|---|---|---|
| 1,266,919 | 5/1918 | Clifford | 15/250.23 |
| 2,144,454 | 1/1939 | Folberth et al. | 15/250.33 |
| 2,644,187 | 7/1953 | Lacy | 15/250.23 |
| 2,787,018 | 4/1957 | Smith | 15/250.73 |
| 2,795,003 | 6/1957 | Fiske | 15/250.23 |
| 3,551,938 | 1/1971 | Yonke | 15/250.23 |
| 4,912,802 | 4/1990 | Raymond | 15/250.23 |

FOREIGN PATENT DOCUMENTS

| | | | |
|---|---|---|---|
| 182631 | 7/1955 | Austria | 15/250.23 |
| 2354804 | 5/1975 | Fed. Rep. of Germany . | |
| 3220501 | 12/1983 | Fed. Rep. of Germany . | |
| 2032769 | 11/1970 | France . | |
| 55780 | 10/1935 | Norway . | |

Primary Examiner—Timothy F. Simone
Assistant Examiner—Gary K. Graham
Attorney, Agent, or Firm—Young & Thompson

[57] ABSTRACT

A vehicle window cleaning arrangement includes a wiper arm (5) which is pivotally mounted at one end thereof and connected to a drive mechanism (6). The arm carries a first and a second wiper blade (7 and 9), of which the second blade is pivotally journalled on the outer end of the wiper arm. A pair of linkage arms (11, 12) are pivotally journalled on the drive mechanism housing (3) and on the second blade and are operative in holding the second blade (9) horizontal irrespective of the pivotal angle of the arm.

4 Claims, 1 Drawing Sheet

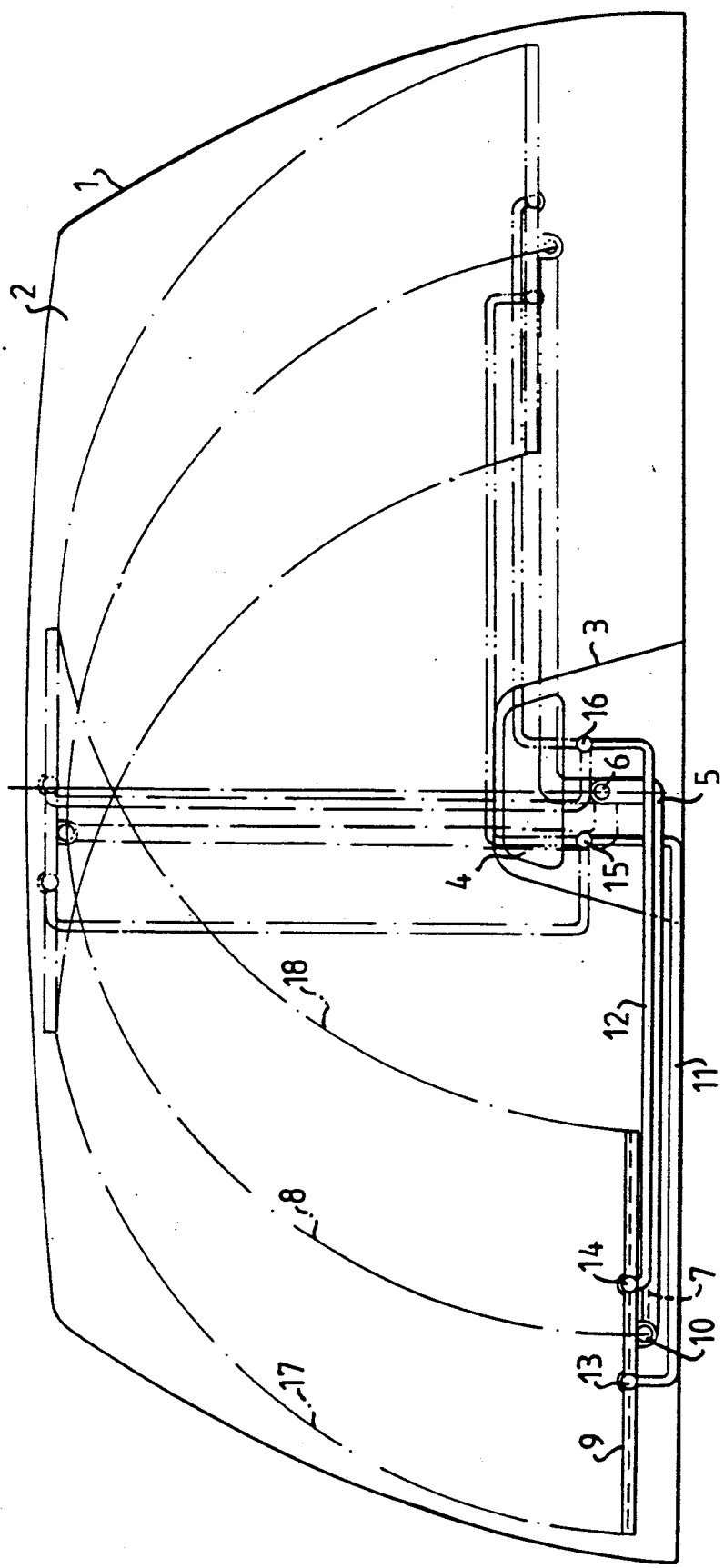

VEHICLE WINDOW CLEANING ARRANGEMENT

BACKGROUND OF THE INVENTION

The present invention relates to an improvement in vehicle window cleaning arrangements of the kind which comprise a wiper arm which is pivotally journalled at one end and connected with a drive mechanism and which carries first and second wiper blades, of which the second blade is journalled for pivotal movement relative to the first blade and is connected to a linkage mechanism operative in varying the angle of the second wiper blade relative to the first wiper blade during pivotal movement of the arm.

One problem of long standing with regard to keeping vehicle windows, primarily vehicle windscreens or windshields, free from water and dirt, is found in the provision of a wiper which will leave the smallest possible area unswept. Parallel pivoting wipers leave an unswept area in the region of the windscreen posts, whereas other pivotable wipers leave unswept a V-shaped area in the centre of the windscreen or window.

In the case of windscreen wipers of this latter kind, it is known to provide one of the wiper blades with an additional blade which is pivotally mounted at one end of the outer extremity of the wiper arm, such as to function as an extension of the standard wiper blade and therewith reduce the unswept area. One such arrangement is described and illustrated in U.S. Pat. No. 2,787,018 and includes a linkage mechanism which when in its starting position holds the additional wiper blade as an extension of the standard blade. As the wiper arm of this arrangement approaches a vertical position, the additional blade is angled so as to place said blade at an angle to the standard blade and within the sweeping area thereof, from the time when the arm is located vertically to the time when it reaches its terminal position.

In recent years it has become more and more usual to equip estate cars and so-called tailgate or five-door saloons with rear window cleaning arrangements. These cleaning arrangements are normally of simple construction, i.e. they comprise a single, centrally located pivotable wiper arm, which pivots through an angle of about 180° and which carries a single wiper blade. The width of the swept area is, in principle, restricted to twice the height, or vertical extension, of the window, which in the majority of cases means that a relatively wide area on both sides of the window remains unswept, i.e. is not cleaned.

SUMMARY OF THE INVENTION

The object of the present invention is to provide a window cleaning arrangement which is intended particularly, but not exclusively, for vehicle rear windows and which is able to sweep over a surface area which is greater than twice the vertical extension or height of the window.

This is achieved in accordance with the invention, by means of a vehicle window cleaning arrangement of the kind described in the introduction, in which the second wiper blade is pivotable at a location between the ends thereof, and in which arrangement the linkage mechanism is effective in adjusting the second wiper blade to a position in which it is at least substantially parallel with the first wiper blade when the wiper arm occupies a starting position, in bringing the second wiper blade perpendicular to the first blade subsequent to the arm having swung through a given angle, and in returning the second wiper blade to its at least substantially parallel position with the first wiper blade subsequent to further pivoting of the wiper arm through a corresponding angle.

The invention is a further development of the aforesaid known window cleaning arrangement. The "double-acting" second wiper blade of the arrangement functions as an extension of the standard blade on both sides of the centre position of the arm, i.e. its vertical position. This will enable the whole width of a window whose width is several times greater than its vertical extension to be cleaned, by suitable choice of the length and journalling point of the second wiper blade.

In order to provide a positive and reliable function and to eliminate the influence of dead points with risk of locking when the arm is pivoted through an angle as large as 180°, the link mechanism of a preferred embodiment of the invention has two link arms which are pivotally connected to the second wiper blade and to a fixed vehicle part, the pivot points of said link arms being located on opposite sides of the pivot axis of the second wiper blade. The geometry of the three pivot points at the respective ends of the arms is identical.

BRIEF DESCRIPTION OF THE DRAWING

The invention will now be described in more detail with reference to an exemplifying embodiment thereof illustrated in the accompanying drawing, the single figure of which is a schematic rear view of a vehicle rear window equipped with a cleaning arrangement constructed in accordance with the invention.

DETAILED DESCRIPTION OF THE PREFERRED EMBODIMENT

The reference numeral 1 identifies the perimeter edge of the rear window 2 of a car. Arranged in a known manner centrally along the lower perimeter edge of the window is a housing 3 for accommodating a braking light 4 and a geared drive motor (not shown) for driving a wiper arm 5. The arm 5 is fixedly mounted on an output shaft 6 extending from the gear, said gear being effective in rotating the shaft reciprocatingly through 180°, when the motor is started. The wiper arm 5 carries a wiper blade 7 on the side thereof facing the window. The chainline 8 illustrates the outer sweep contours of the blade 7 when the arm is swung through 180°.

In accordance with the invention, an additional wiper blade 9 is pivotally journalled on the arm 5, via a pivot connection 10 on the outer extremity of said arm. The pivot connection 10 is located on the centre point of the blade 9 and the blade is connected on opposite sides of the pivot connection 10 with the respective outer ends of a pair of link arms 11, 12, via respective pivot connections 13 and 14. The inner ends of the link arms 11, 12 are connected to the housing 3 via respective pivot connections 15 and 16. The rotational axes of the pivot connections 10, 13 and 14 respectively, and also the respective rotational axes of the shaft 6 and the pivot connections 15 and 16 form the corners of two isosceles triangles, which are congruent.

The described arrangement provides a double parallelogram system which eliminates the effect of dead points when the arm 5 is swung through 180°. Thus, the arm 5 can be swung from the left-hand, "parking position", shown in full lines, to the right-hand and slightly elevated position shown in chain lines, without risk of the system locking when first the one and then the other of the pivot connections of the second link arms 11 and 12 and the wiper arm 5 coincide linearly with one another.

When the arm 5 is swung, the additional wiper blade 9 will constantly lie horizontally and sweep over the area located between the chain lines 17 and 18. Thus, as the wiper arm 5 is swung from its parking position to its vertical position, that half of the blade 9 which lies to the left of the pivot connection 10 will function as an extension of the standard blade 7, whereas the blade half which lies to the right of said pivot connection 10 will function as a blade extension upon continued wiping movement of the arm from its vertical position to its right-hand position.

As will be seen from the figure and also from the above description, the inventive arrangement enables the breadth of the swept area to extend to the breadth of the window, simply by adapting the length of the additional wiper blade. By angling the link arms 11, 12 at both ends, in the manner illustrated in the drawing, there is obtained an arrangement which will restrict the rear view through the rear window only to a slight extent when the wiper arm is in its "parking position".

Although the invention has been described solely with reference to a single embodiment thereof, it will be understood that various modified embodiments are conceivable within the scope of the following claims. For instance, the inner and outer blades may be of mutually the same lengths and may also be fully identical with the exception of their respective attachments. Furthermore, the wiper arm 5 may be journalled closest to the window, in which case the link arms 11, 12 may be journalled in a separate plate located externally of the wiper arm journal. This will enable the link arms to be made completely straight and also identical, and will also enable the journal locations of the link arms and the wiper arm to be placed mutually in line, so that the link arms will lie above the wiper arm in the parking position.

I claim:

1. A vehicle window cleaning arrangement, comprising a wiper arm which is pivotally journalled at one end thereof to a fixed vehicle part (3), and connected to a drive mechanism and which carries first and second wiper blades, of which the second wiper blade is journalled to the wiper arm, for pivotal movement relative to the wiper arm, and connected to a linkage mechanism effective in varying the angle of the second wiper blade relative to the first wiper blade during pivotal movement of the wiper arm, characterized in that the second wiper blade (9) is pivotable at a point (10) located between the ends of said second blade; and in that the linkage mechanism (11, 12) is operative in adjusting the second wiper blade to a position in which it lies at least substantially parallel with the first wiper blade (7) in a starting position of the arm (2), in adjusting the position of the second blade, subsequent to pivotal movement of the arm through a given angle, so that said second blade will lie perpendicular to the first blade, and in resetting the second blade to the position in which it is at least substantially parallel with the first blade subsequent to further pivotal movement of the wiper arm through a corresponding angle, said linkage mechanism determining the position of said blades relative to each other in all positions of said wiper arm, the linkage mechanism including first and second link arms (11, 12) each of which are pivotally connected to the second wiper blade (9) and to the fixed vehicle part (3); the pivot points (13, 15) of the first link arm being located on opposite sides of the respective pivot axes of the second blade and the wiper arm (10 and 6 respectively) with respect to the pivot points of the second link arm (14, 16), in a horizontal direction; and the mutual geometries of the three pivot axes (10, 13, 14 and 6, 15, 16 respectively) on the second wiper blade and the fixed vehicle part being identical.

2. An arrangement according to claim 1, wherein the link arms (11, 12) are angled at both ends thereof.

3. An arrangement according to claim 1, said linkage mechanism (11, 12) maintaining said second wiper blade horizontal in all positions of said wiper arm.

4. An arrangement according to claim 1, said wiper arm sweeping an arc having two extreme end positions, said second blade being parallel to said first blade in said two extreme end positions and perpendicular to said first blade in a position of said wiper arm intermediate said two end positions.

* * * * *